Figure 3:
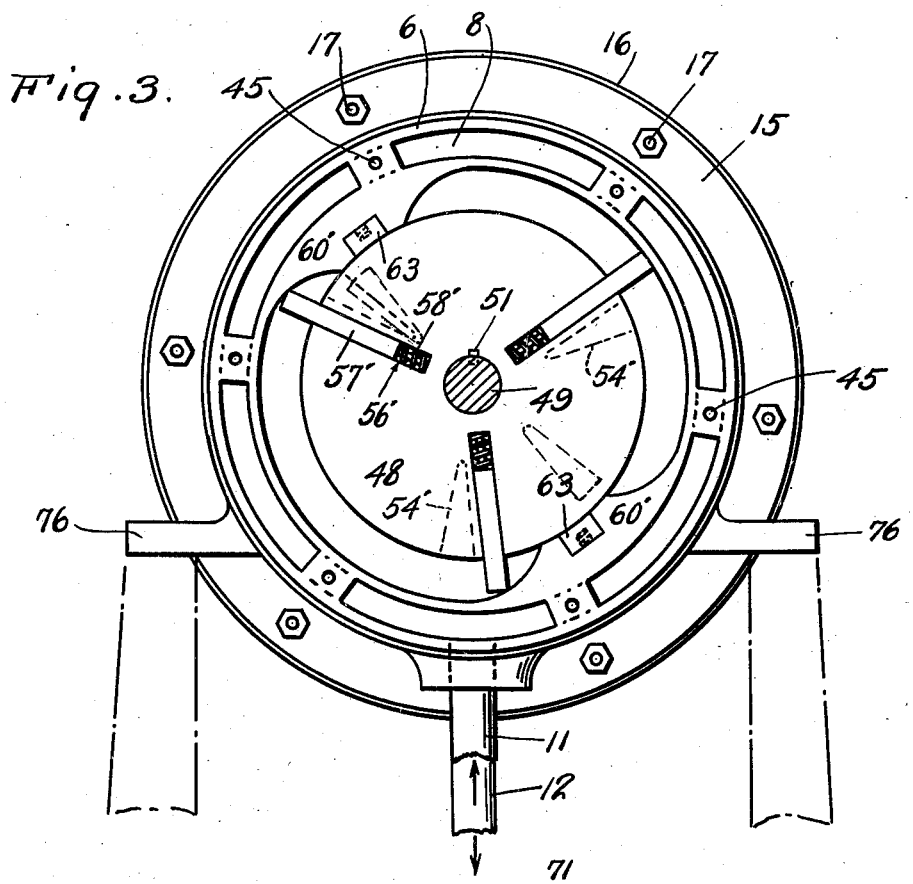

Feb. 10, 1931.                 H. E. NICHOLS                    1,792,026
                    ROTARY INTERNAL COMBUSTION ENGINE
                        Filed July 3, 1928        4 Sheets-Sheet 1
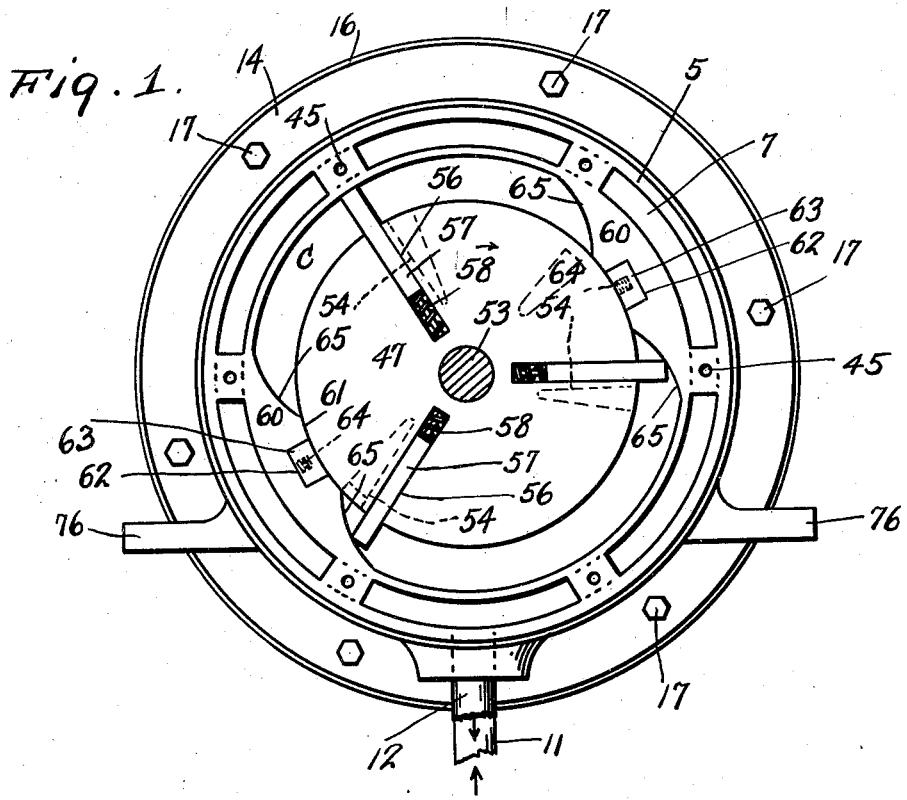
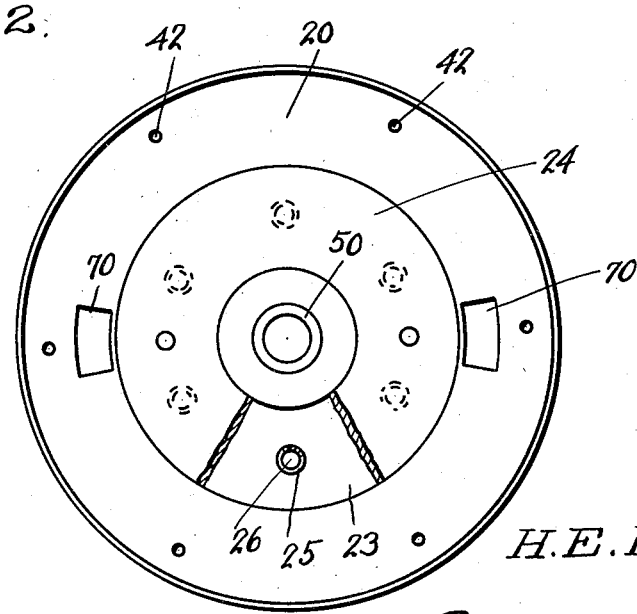
Inventor
H. E. Nichols
By Clarence A. O'Brien
                Attorney Feb. 10, 1931. H. E. NICHOLS 1,792,026
ROTARY INTERNAL COMBUSTION ENGINE
Filed July 3, 1928 4 Sheets-Sheet 2

Inventor
H. E. Nichols
By Clarence A. O'Brien
Attorney

Feb. 10, 1931.  H. E. NICHOLS  1,792,026
ROTARY INTERNAL COMBUSTION ENGINE
Filed July 3, 1928    4 Sheets-Sheet 3
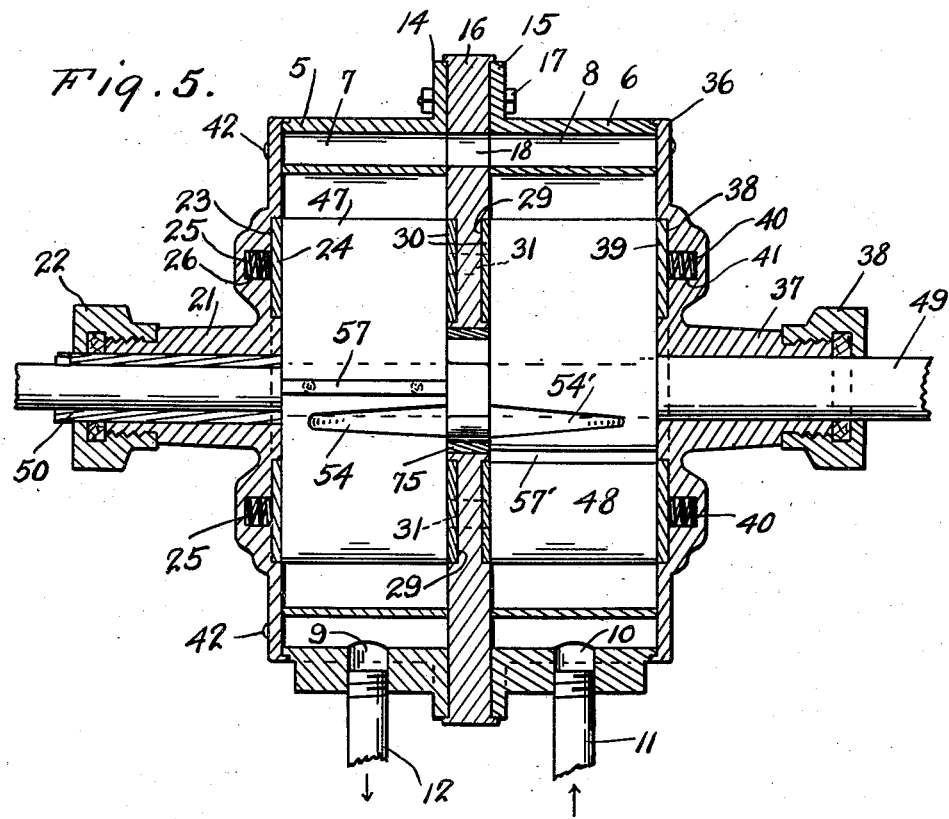
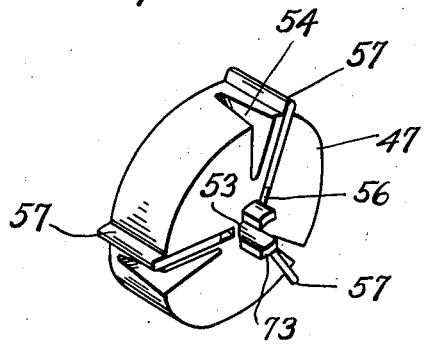
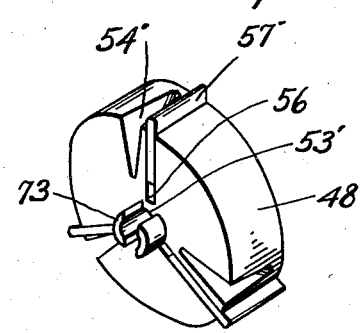
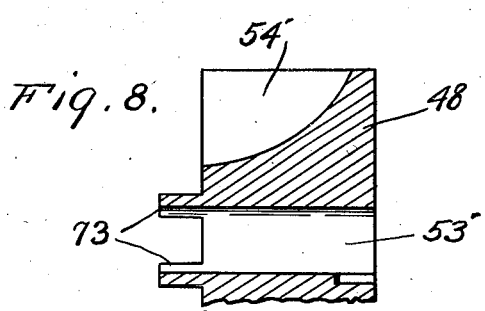
Inventor
H. E. Nichols
By Clarence A. O'Brien
Attorney Feb. 10, 1931.   H. E. NICHOLS   1,792,026
ROTARY INTERNAL COMBUSTION ENGINE
Filed July 3, 1928   4 Sheets-Sheet 4
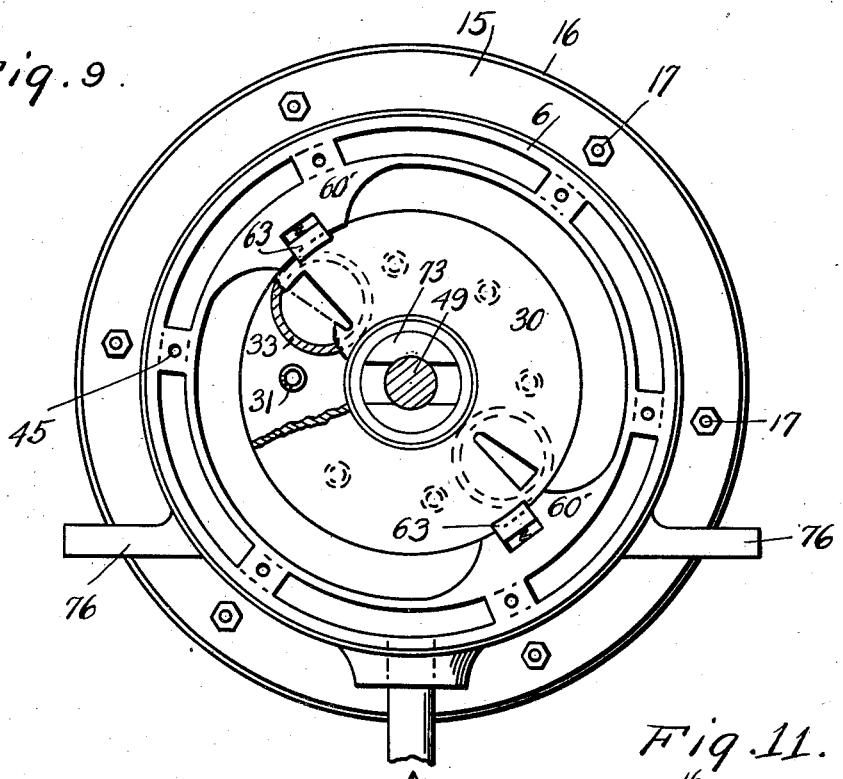
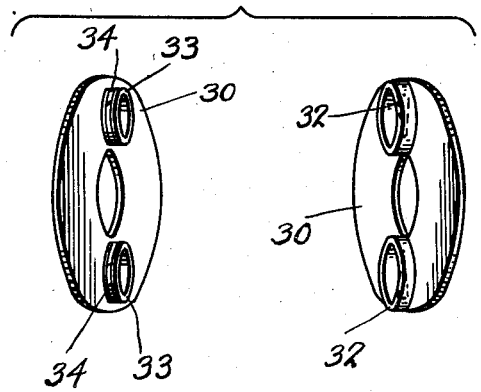
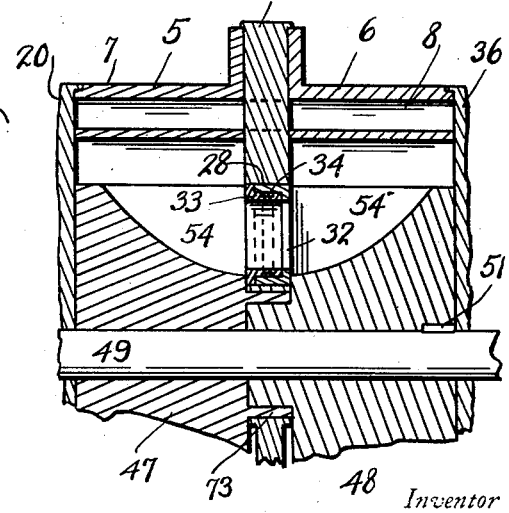
Inventor
H. E. Nichols
By Clarence A. O'Brien
Attorney Patented Feb. 10, 1931

1,792,026

UNITED STATES PATENT OFFICE

HART E. NICHOLS, OF PHOENIX, ARIZONA

ROTARY INTERNAL-COMBUSTION ENGINE

Application filed July 3, 1928. Serial No. 290,143.

The present invention relates to a rotary internal combustion engine and has for its prime object to provide a shell with a pair of rotors in compartments provided in the shell, one of the rotors having means therein to intake and compress combustible gases for delivery to the other compartment in which the gases are fired for causing the rotation of the rotors and the rotors in the other compartment exhausting the burnt gases.

Another very important object of the invention resides in the provision of packing in association with the rotor to prevent the leakage of gases.

Another very important object of the invention resides in the provision of a shell provided by a partition head having portions extending therethrough and packing rings associated therewith having bosses in the passages, said bosses being telescopically associated with each other and provided with ports for the passage of the gas from one compartment to the other.

A still further very important object of the invention resides in the provision of an engine of this nature with an exceedingly simple construction and may be manufactured at a comparatively low cost yet constructed in a strong and durable manner.

A further important object of the invention resides in the provision of an engine of this nature which is thoroughly efficient and reliable in its operation, not likely to easily become out of order, easy to assemble and disassemble, compact in its arrangement of parts and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
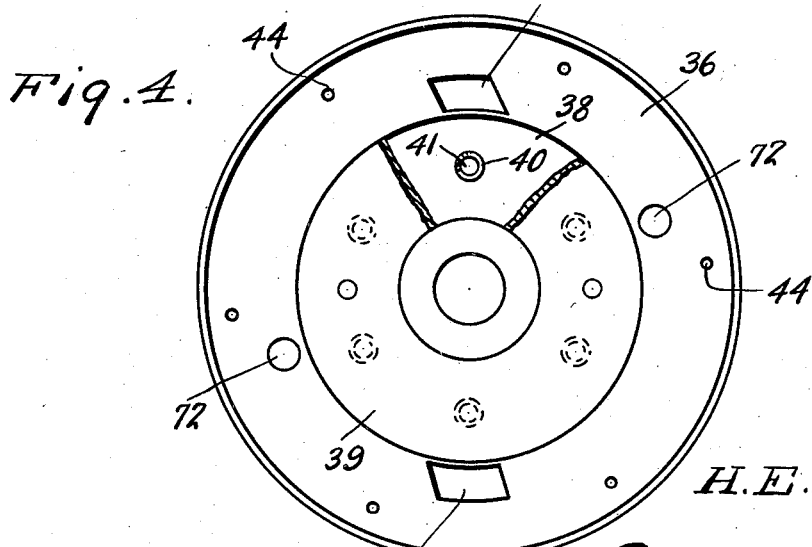

In the drawings:

Figure 1 is a front elevation of the engine embodying the features of my invention with the front head removed, Figure 2 is an inside elevation of the front head showing a portion of the packing disk broken away, Figure 3 is a rear end elevation of the engine with the rear head removed, Figure 4 is an inside elevation of the rear end showing the packing disk partly broken away, Figure 5 is a vertical longitudinal section through the engine, Figure 6 is a perspective view of the rotor in the intake and compression compartment, Figure 7 is a perspective view of the other rotor, Figure 8 is a fragmentary detail section through one of the rotors showing the port notched therein, Figure 9 is a view similar to Figure 3 but showing the rotor in the explosion and exhaust compartment removed and one of the packing disks partly broken away, Figure 10 is a view showing the partition head packing disk disassembled, and Figure 11 is a fragmentary detail longitudinal section showing notch ports of the rotors registering with each other and ports in the partition head and the packing disks associated therewith.

Referring to the drawings in detail it will be seen that the shell or casing of this engine includes a pair of cylindrical sections 5 and 6 jacketed as at 7 and 8 respectively. The bottoms of the shell sections 5 and 6 having respectively, openings 9 and 10. An inlet water pipe 11 is threaded into the opening 10 and an outlet water pipe 12 is threaded into the opening 9. The inner adjacent edges of the shell sections 5 and 6 are provided with annular outwardly directed flanges 14 and 15 respectively.

A partition head 16 is disposed between the sections 5 and 6 and the flanges 14 and 15 are bolted thereto as at 17. This partition head 16 in its upper portion is provided with an opening 18 registering with the upper portions of the jackets 7 and 8. It will therefore be seen that water circulates from the pipe 11 through the jacket 8 through the opening 18, through the jacket 7 and out through the pipe 12.

A front cylinder head 20 is secured to the shell section 5 at its front end remote from the partition head 16. At the center of the head 20 there is formed an elongated outwardly directed bearing 21 with an oil retaining cap 22 threaded on the end thereof.

On the inner face of the head 20 there is provided an annular recess 23 disposed concentrically about the axis of the bearing 21. In the recess 23 there is seated an annular disk 24 pressed inwardly by spring 25 in recesses 26 in the head 20.

The partition head 16 is formed with a pair of openings 28 on opposite sides of the center thereof and on the faces thereof there are provided annular recesses 29 concentric about said center and crossing said openings 28. Packing ring disks 30 are seated in the recesses 29 and are pressed outwardly by springs 31 seated in openings in the partition head 16.

These ring disk packings 30 are provided with telescopically associated bosses, a pair 32 on one disk 30 disposed over a pair 33 on the other disk 30. The bosses 33 are provided with packing rings 34.

On the rear end of the shell section 6 there is mounted a head 36. At the center of the head 36 there is an outwardly projecting elongated bearing 37 with an oil retaining cap 38 threaded on the end thereof. The inner face of the head 36 is provided with an annular recess 38 concentric about the center of the head for receiving a packing ring disk 39 pressed inwardly by springs 40 in recesses 41.

The heads 20 and 36 are held in place by suitable fastening elements 42 passing through openings 43 in the head 20, openings 44 in the head 36 and openings 45 in the shell sections 5 and 6.

A rotor 47 is disposed in the intake and compression compartment formed by the shell section 5 with heads 16 and 20 while a rotor 48 is disposed in the explosion and exhaust compartment formed by the shell section 6 and heads 16 and 36.

A shaft 49 is journaled in bearings 21 and 37. This shaft is reduced in the bearing 21 and has a sleeve bushing 50 disposed thereabout. The rotor 48 is keyed to the shaft 49 as is indicated at 51. The packing ring disks 24, 30 and 39 impinge against the adjacent faces of the rotors 47 and 48 as will be apparent from an inspection of Figure 5.

The rotor 47 is of cylindrical formation and has a central opening 53 for receiving the shaft 49. At the periphery to the inner side this rotor 47 is provided with notched ports 54 situated at equal intervals about the rotor and in the present instance three in number.

Considering the rotor 47 from the front end of the engine it will be seen that the notched ports 54 are disposed on the rear face and periphery thereof and considering the rotor moving in a clockwise direction when viewed from the front end of the engine it will be seen that radial recesses 56 are provided therein one immediately to the rear of each notched port 54 and vanes 57 are disposed therein being spring pressed outwardly as at 58. The intake and compression compartment in the shell 5 is formed with a pair of diametrically opposed inwardly extending humps 60 having seats 61 concentric to the shaft 49 and ground to receive the periphery of the rotor 47.

In each seat 61 there is a recess 62 with packing strips 63 therein pressed against the periphery of the rotor 47 by springs 64. The ends 65 of the hump 60 are curved so that the vanes 57 which engage therewith will be forced inwardly of their recesses 56 gradually and will allow the springs 58 to force the vanes outwardly gradually.

The rotor 48 is considerably similar in construction to the rotor 47 being formed with a central opening 53', notches 54', recesses 56', vanes 57', springs 58'. The notched ports 54', however, are disposed to the front of the rotor 48 and register with the notched ports 54 and the vanes 57' and their recesses 56' are located in advance of the notched ports 54' to provide for the passage of gases from the section 5 into the section 6 when ports 54 are 54' register with ports in the bosses 33.

The explosion and exhaust chamber in the shell 6 is provided with humps 60' similar in all respects to humps 60 except as to location. The humps 60' are disposed on opposite sides of the shaft 49. The humps 60 and 60' are disposed alternately about the shaft 49 at 90° intervals. The head 20 is provided with intake ports 70 one to the rear of the hump 60 considering the direction of rotation and the head 36 is provided with exhaust ports 71, one to the front of each hump 60'.

This head 36 is also provided with a spark plug opening 72 between the exhaust ports 71. The rotors 47 and 48 are provided with keys 73 extending along the shaft 49 through central opening in the partition head 16, this opening having a ring 75 therein.

The keys are bowed transversely and those of one rotor fit between those of the other rotor so as to cause the rotors to rotate together. Supporting lugs 76 extend outwardly from the shell sections 5 and 6 so that the engine may be mounted on any suitable supporting structure.

Considering in detail one cycle of operation it will be seen that as one of the vanes 57 moves away from one of the humps 60 and the adjacent intake port 70, combustible gases will be sucked through said intake ports to fill one of the chambers C between the two humps 60, the rotor 47 and the inner shell wall of section 5.

When the next vane 57 passes by said selected hump 60 in this cycle of operation the gases are compressed in the chamber C until the notch port in advance of said other vane 57 registers with the bosses 32 and 33 so that the compressed gas will pass through these bosses into the registering notch of the rotor 48 immediately to the rear of one of the vanes 57' and when said vane 57' passes by adjacent hump 60' and spark plug opening 72 ignition will take place to explode the mixture and drive said vane 57' around to pass an exhaust opening or port 71 and then as the next vane 67' comes around the burnt gases will be forced out through said exhaust port 71.

Thus the cycle of operation is complete. In the present example of the invention disclosed in the drawing there are two chambers and three vanes in each shell section and one spark plug in each combustion or explosion chamber and firing alternately one on each wing in each combustion chamber thereby providing six explosions to one revolution of the shaft.

I do not desire to be limited in any way to the particular number of chambers, vanes and the like indicated in this particular example. There is, of course, no limit to the number of compression chambers and combustion chambers which may be used but, of course, there must be one spark plug, one exhaust port and one intake port to each chamber, the result being that there are as many explosions per revolution as there are chambers, times vanes.

It is thought that the construction, operation, and advantages of this invention will now be quite apparent to those skilled in this art without a more detailed description thereof. The present embodiment of the invention has been disclosed in detail merely for the purpose of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a rotary internal combustion engine, a shell in two parts, each part being of general cylindrical formation, a partition head between the parts to provide an intake and compression compartment and an explosion and exhaust compartment, heads at the end of the shell, a shaft journaled in the head to extend through the shell, said partition head having an opening therein, a pair of rotors, one in each compartment, one of the rotors being keyed to the shaft, means keying the other rotor to said one rotor, said means extending through said opening in the partition head, said rotors having notches at the inner sides of their edges, radial outwardly spring pressed vanes in the rotor, one of said vanes being disposed immediately to the rear of each notch in the rotor of the intake and compression compartment, one of said vanes being disposed immediately below the front of each notch in the other rotor, said partition having openings with which the notches of the rotors simultaneously register for transferring compressed gases from the intake and compression compartment to the other compartment, the parts of the shell having inwardly directed humps, one hump of one part being located to one side of each of the last mentioned openings in the partition head and one hump of the other part being located to the other side of said each of the last mentioned openings, the head adjacent the intake and compression compartment having intake ports one to the opposite side of each hump to which the opening in the partition is disposed, the head adjacent the explosion and exhaust compartment having exhaust ports to the opposite sides of the hump from the openings in the partition head, the last mentioned compartment head also having spark plug openings between the exhaust ports.

2. In a rotary internal combustion engine, a shell in two parts, each part being of general cylindrical formation, a partition head between the parts to provide an intake and compression compartment and an explosion and exhaust compartment, heads at the end of the shell, a shaft journaled in the head to extend through the shell said partition head having an opening therein, a pair of rotors, one in each compartment, one of the rotors being keyed to the shaft, means keying the other rotor to said one rotor, said means extending through said opening in the partition head, said rotors having notches at the inner sides of their edges, radial outwardly spring pressed vanes in the rotor, one of said vanes being disposed immediately to the rear of each notch in the rotor of the intake and compression compartment, one of said vanes being disposed immediately below the front of each notch in the other rotor, said partition having openings with which the notches of the rotors simultaneously register for transferring compressed gases from the intake and compresion compartment to the other compartment, the parts of the shell having inwardly directed humps, one hump of one part being located to one side of each of the last mentioned openings in the partition head and one hump of the other part being located to the other side of said each of the last mentioned openings, the head adjacent the intake and compression compartment having intake ports one to the opposite side of each hump to which the opening in the partition is disposed, the head adjacent the explosion and exhaust compartment having exhaust ports to the opposite sides of the hump from the openings in the partition head, the last mentioned compartment head also having spark plug openings between the exhaust ports, said heads having ring packing disks and springs pressing said disks against the sides of the rotor.

3. In a rotary internal combustion engine, a shell in two parts, each part being of general cylindrical formation, a partition head between the parts to provide an intake and compression compartment and an explosion and exhaust compartment, heads at the end of the shell, a shaft journaled in the head to extend through the shell, said partition head having an opening therein, a pair of rotors, one in each compartment, one of the rotors being keyed to the shaft, means keying the other rotor to said one rotor, said means extending through said opening in the partition head, said rotors having notches at the inner sides of their edges, radial outwardly spring pressed vanes in the rotor, one of said vanes being disposed immediately to the rear of each notch in the rotor of the intake and compression compartment, one of said vanes being disposed immediately below the front of each notch in the other rotor, said partition having openings with which the notches of the rotors simultaneously register for transferring compressed gases from the intake and compression compartment to the other compartment, the parts of the shell having inwardly directed humps, one hump of one part being located to one side of each of the last mentioned openings in the partition head and one hump of the other part being located to the other side of said each of the last mentioned openings, the head adjacent the intake and compression compartment having intake ports one to the opposite side of each hump to which the opening in the partition is disposed, the head adjacent the explosion and exhaust compartment having exhaust ports to the opposite sides of the hump from the openings in the partition head, the last mentioned compartment head also having spark plug openings between the exhaust ports, said heads having ring packink disks and springs pressing said disks against the sides of the rotor, said disks between the rotors having hollow telescoping bosses in the openings in the partition head.

4. In a rotary internal combustion engine, a shell having an intake and compression compartment, and an explosion and exhaust compartment, a partition head between the compartments, rotors in the compartments, means associated with the rotor in the first mentioned compartment for intaking and compressing gases, means in the other compartment for exploding gases and causing the rotation of the rotors by the explosion of the gases and for exhausting the gases, said partition head having openings to transfer the gases from one compartment to the other compartment, spring pressed ring packing disks on the head to bear against the rotors and having hollow telescopically associated bosses extending through the opening.

5. In a rotary internal combustion engine, a shell having an intake and compression compartment, and an explosion and exhaust compartment, a partition head between the compartments, rotors in the compartment, means associated with the rotor in the first mentioned compartment for intaking and compressing gases, means in the other compartment for exploding gases and causing the rotation of the rotors by the explosion of the gases and for exhausting the gases, said partition head having openings to transfer the gases from one compartment to the other compartment, spring pressed ring packing disks on the head to bear against the rotors and having hollow telescopically associated bosses extending through the opening, said rotors having peripheral notched ports at adjacent sides thereof to register with the hollow bosses.

6. In a rotary internal combustion engine, a shell having an intake and compression compartment, and an explosion and exhaust compartment, a partition head between the compartments, rotors in the compartment, means associated with the rotor in the first mentioned compartment for intaking and compressing gases, means in the other compartment for exploding gases and causing the rotation of the rotors by the explosion of the gases and for exhausting the gases, said partition head having openings to transfer the gases from one compartment to the other compartment, spring pressed ring packing risks on the head to bear against the rotors and having hollow telescopically associated bosses extending through the opening, said rotors having peripheral notched ports at adjacent sides thereof to register with the hollow bosses, a shaft journaled in the shell, one of the rotors being keyed to the shaft, and means extending through a central opening in the partition head for connecting the rotors together.

7. In a rotary internal combustion engine, a shell having an intake and compression compartment, and an explosion and exhaust compartment, a partition head between the compartments, rotors in the compartment, means associated with the rotor in the first mentioned compartment for intaking and compressing gases, means in the other compartment for exploding gases and causing the rotation of the rotors by the explosion of the gases and for exhausting the gases, said partition head having openings to transfer the gases from one compartment to the other compartment, spring pressed ring packing disks on the head to bear against the rotors and having hollow telescopically associated bosses extending through the opening, said rotors having peripheral notched ports at adjacent sides thereof to register with the hollow bosses, a shaft journaled in the shell, one of the rotors being keyed to the shaft, and means extending through a central opening in the partition head for connecting the rotors together, said last mentioned means comprising lugs projecting from the rotors in alternate arrangement to be disposed between one another.

In testimony whereof I affix my signature.

HART E. NICHOLS.